United States Patent [19]

Deeg et al.

[11] Patent Number: 5,093,062

[45] Date of Patent: Mar. 3, 1992

[54] PROCESS FOR SPINNING PRECERAMIC POLYMERS

[75] Inventors: Martin H. G. Deeg, Cherry Hill; Joseph J. DiBiase, Hopatcong; Joseph Pickton, New Providence, all of N.J.

[73] Assignee: Hoechst Celanese Corp., Somerville, N.J.

[21] Appl. No.: 563,901

[22] Filed: Jun. 19, 1990

Related U.S. Application Data

[63] Continuation of Ser. No. 184,924, Apr. 22, 1988, abandoned.

[51] Int. Cl.$^5$ .................. B28B 3/20; B29C 47/78
[52] U.S. Cl. ..................... 264/176.1; 264/211.14
[58] Field of Search .......... 264/176.1, 211.11, 211.21, 264/211.22, 211.23, DIG. 36, 211.14

[56] References Cited

U.S. PATENT DOCUMENTS

| | | | |
|---|---|---|---|
| 2,278,875 | 4/1942 | Graves | 264/176.1 |
| 2,683,073 | 7/1954 | Pierce | 264/85 |
| 3,102,301 | 9/1963 | Dechene | 264/40.2 |
| 3,474,773 | 10/1969 | Brignac et al. | 125/343.5 R |
| 4,639,205 | 1/1987 | Lim | 264/176.1 X |
| 4,789,507 | 12/1988 | Wesley et al. | 264/176.1 X |
| 4,810,443 | 3/1989 | Barnard | 264/29.5 |
| 4,826,425 | 5/1989 | Maekawa et al. | 264/176.1 X |

OTHER PUBLICATIONS

Encyclopedia of Chemical Technology, Kirk-Othmer, Third Edition, vol. 18, pp. 382-385.

Primary Examiner—Richard D. Lovering
Attorney, Agent, or Firm—DePaoli & O'Brien

[57] ABSTRACT

Organometallic preceramic polymers are melt spun into fibers utilizing a spinning apparatus which directs the preceramic polymer from a stagnant melt pool of said polymer to a spinneret. The spinneret is one used for solvent spinning and, thus, has a shorter residence time during extrusion through the spinneret orifice than conventional melt spinning spinnerets.

12 Claims, 1 Drawing Sheet

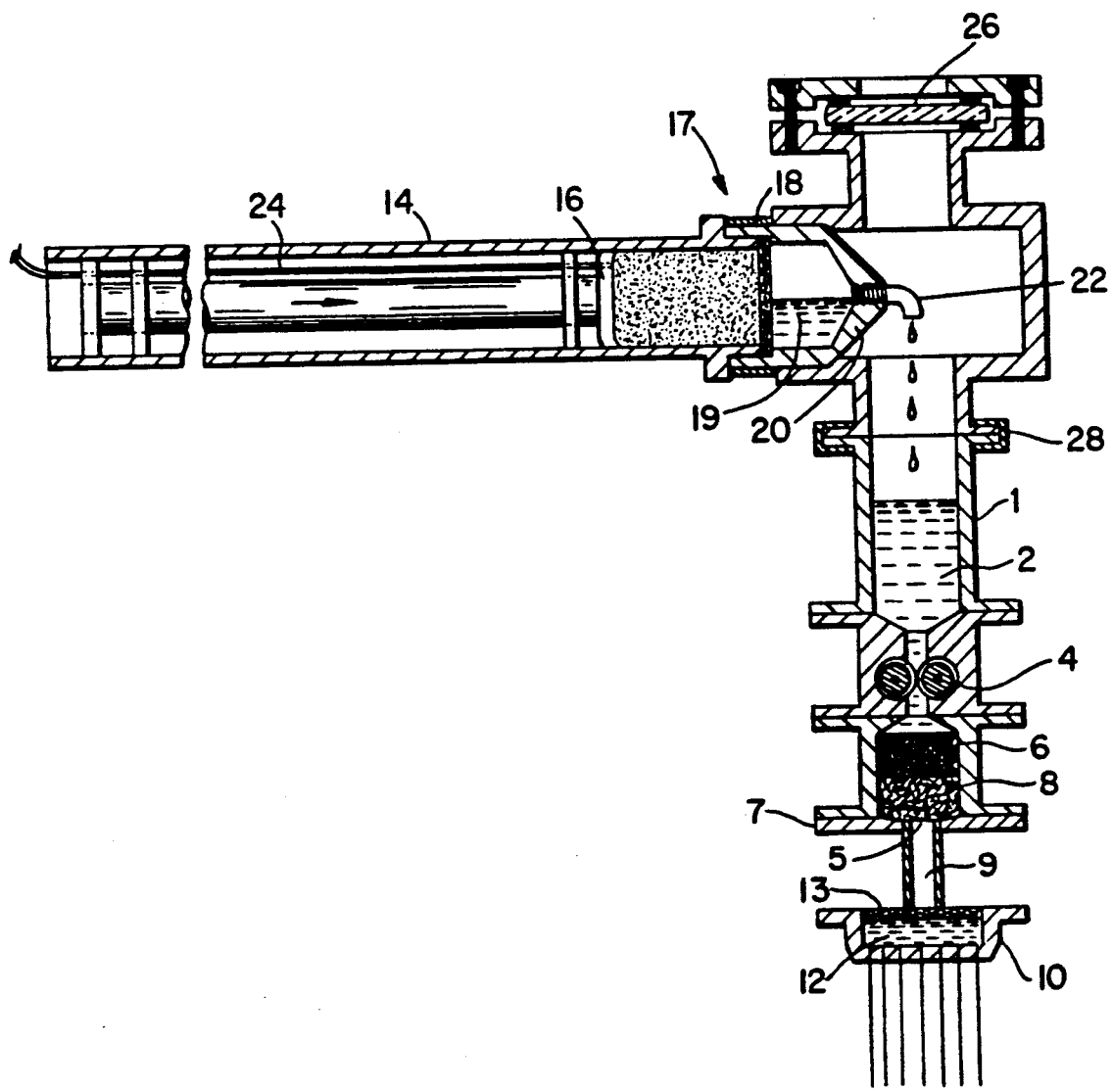

PROCESS FOR SPINNING PRECERAMIC POLYMERS

This invention was made with Government support under Contract No. F-33615-83-C-5006 awarded by the Department of Defense (DOD). The Government has certain rights in this invention.

This application is a continuation of application Ser. No. 184,924, filed Apr. 22, 1988, and now abandoned.

FIELD OF THE INVENTION

The present invention relates to an improved method and apparatus for the production of ceramic fibers from organometallic preceramic polymers. More particularly, this invention relates to a method and apparatus for melt spinning organometallic preceramic polymers into preceramic fibers which are subsequently converted by thermal treatment to ceramic form.

BACKGROUND OF THE INVENTION

Ceramic materials are of critical importance for a number of high temperature, high performance applications such as gas turbines. These applications require a unique combination of properties such as high specific strength, high temperature mechanical property retention, low thermal and electrical conductivity, hardness and wear resistance, and chemical inertness. Design reliability and the need for economical fabrication of complex shapes, however, have prevented ceramic materials from fulfilling their potential in these critical high temperature, high performance applications.

The design reliability problems with ceramics, and the resultant failure under stress, are due largely to the relatively brittle nature of ceramics. This, in combination with the high cost of fabricating complex shapes, has limited the usage of ceramics.

Ceramics made from organometallic polymers such as organosilicon polymers have the potential to overcome these problems. To this end, polymers based on silicon, carbon and/or nitrogen and oxygen have been developed. See, for example, "Siloxanes, Silanes and Silazanes in the Preparation of Ceramics and Glasses" by Wills et al, and "Special Heat-Resisting Materials from Organometallic Polymers" by Yajima, in Ceramic Bulletin, Vol. 62, No. 8, pp. 893-915 (1983), and the references cited therein.

The major and most critical application for ceramics based on polymer processing is high strength, high modulus, reinforcing fibers. Such fibers are spun from organosilicon preceramic polymers and are subsequently converted to ceramic materials, in particular, silicon carbide/silicon nitride bearing fibers by a two-step process of curing to render the preceramic polymer fiber insoluble followed by a routine pyrolyzation schedule comprising heating the fiber up to about 1,200° C. where upon the fiber is converted to the ceramic form.

Unfortunately, great difficulty has been experienced in melt spinning these organometallic preceramic polymers into fibers utilizing conventional extrusion equipment. Melt spinning is a preferred method of forming fibers and simply involves melting the polymer and extruding the polymer through a spinneret. In melt spinning there is no need for compatible, yet inert, solvents to dissolve the polymer and/or for use as coagulating baths as in solvent spinning processes nor, is there a need for a drying atmosphere as in solvent spinning using the dry spinning technique. Thus, a useful melt spinning process for producing preceramic fibers from organometallic polymers would be very advantageous.

Heretofore, in the melt extrusion of preceramic organometallic polymers, conventional fiber forming equipment has been utilized. A typical operation for melt spinning the organometallic polymers into fibers involves screw-feeding the preceramic polymer in powder form from a hopper into a heated extruder barrel. An extruder screw carries the powder along the heated barrel of the extruder which causes the polymer to melt. A polymer metering pump feeds the molten polymer to a filter pack upstream of the spinneret to remove contaminates and any agglomerated unmelted polymer. The polymer emerges from the spinneret in fiber form.

While conventional melt spinning processes have been found useful in forming fibers from high molecular weight synthetic polymers, melt spinning has not yet been able to produce sufficiently long fibers from organometallic preceramic polymers. One reason for the difficulty is the low molecular weight of these organometallic preceramic polymers. The molecular weight of these preceramic polymers typically does not exceed 20,000 ($M_n$) and most usually falls within a range of from about 500 to about 2,500. The low molecular weight manifests itself into several problems. For example, the preceramic polymer is crushed into a very fine powder when fed from a conventional hopper apparatus which contains a metering screw and as well by the extruder screw as the polymer travels through the extruder barrel. The powder which is formed tends to pack and form agglomerates at the hopper exit adversely affecting the uniformity of the amount of polymer fed to the extruder. Moreover, packing and formation of agglomerates of polymer powder takes place in the extruder barrel. Mixing and melting into a uniformly molten polymer cannot effectively be obtained. These problems related to the polymer flow consequently result in nonuniform flow from the metering pump to the spinneret and ultimately in the inability to produce adequate fibers from the polymer. One method thought to control the packing problem was to starve feed the extruder, thus, lowering the amount of polymer fed to the extruder barrel for melting. However, using this technique, the full extruder barrel is not filled and as such a uniform screw pressure cannot be maintained. The lack of a uniform pressure again adversely effects the polymer metering pump which cannot uniformly feed the spinneret. Another difficulty has been the tendency of these preceramic polymeric compositions to bubble. The bubbles also interfere with the capacity of the pump to meter the polymer uniformly to the spinneret.

Attempts have been made to solve the problem of bubble formation during the formation of films or fibers from polymeric materials such as nylons and polyesters which exhibit excessive bubble formation during extrusion. Thus U.S. Pat. No. 2,278,875 discloses feeding the polymer to the metering pump from a reservoir or pool of the molten polymer instead of from an extrusion device. U.S. Pat. No. 3,474,773 also utilizes a melt pool feeding system for forming polymeric yarns. Neither of these patents suggests spinning organometallic preceramic polymers into fibers utilizing the melt pool technique in order to solve the unique problems inherent in spinning these low molecular weight materials.

SUMMARY OF THE INVENTION

In accordance with the present invention, organometallic preceramic polymers are melt spun into fibers by feeding the spinneret from a static melt pool of the polymer. Thus, in the process of this invention, an extrusion device for melting the polymer and screw-feeding the melted polymer to the polymer metering pump is eliminated and, instead, the polymer in molten form is fed without back pressure to a reservoir in which is formed a pool of the molten polymer. The melt pool serves as the supply for the polymer metering pump which feeds the polymer from the pool to the spinneret. The problems associated with polymer packing and agglomerate formation found during feeding and melting of the low molecular weight organometallic polymers by extrusion devices is now overcome. Overcome, as well, are the difficulties in uniformly feeding the spinneret with a homogenously melted polymer and ultimately forming fibers from these polymers.

In another aspect of the present invention, successful melt spinning of the organometallic polymers into fiber is accomplished utilizing a spinneret which is used for spinning solvated polymers into fibers. The solvent spinning spinneret used is cup-shaped allowing for the formation of a small melt pool upstream and contiguous of the face of the spinneret. This melt pool at the spinneret is believed to facilitate fiber formation.

BRIEF DESCRIPTION OF THE DRAWING

The FIGURE illustrates the melt pool spinning apparatus for spinning organometallic preceramic polymers into fiber in accordance with the present invention.

DETAILED DESCRIPTION OF THE INVENTION

The organometallic polymers which can be spun into fibers in accordance with the process of this invention are those which contain a backbone of metal elements linked together in a chain or alternately with a non-metallic element such as carbon, nitrogen, phosphorous and the like.

Organosilicon preceramic polymers, for example, are useful in this invention and are well known in the art. Such polymers contain silicon, carbon and/or nitrogen, and/or oxygen, are fiber-forming, and can be cured and pyrolyzed to ceramic form. See, for example, U.S. Pat. Nos. 4,310,651; 4,312,970; 4,342,712; 4,482,689; and 4,340,619, which are incorporated herein by reference. Such polymers optionally may be modified with chemical groups to allow subsequent curing in the absence of oxygen. These organosilicon precursor polymers may be made in a variety of ways as is known in the art. For example, they may be made by first dechlorinating an alkylchlorosilane, e.g., dimethyldichlorosilane, and polymerizing the product to form a polysilane, e.g., polydimethylsilane. This material is then heated to convert its backbone of silicon atoms to a backbone of alternating silicon and carbon atoms by forming a polycarbonsilane. The organosilicon preceramic polymers utilized in the present invention may consist essentially of silicon, carbon and nitrogen. Such polymers include polysilazanes typically prepared by reacting a disilazane and a dichlorodisilane or a methylchlorodisilane, e.g. methylchlorodisilane and hexamethyldisilazane. A preferred polysilazane is a hydridopolysilazane formed by reacting trichlorosilane with hexamethyldisilazane.

The addition of difunctional monosilanes as co-reactants may be used to enhance spinning and/or subsequent fiber handling properties. Such difunctional monosilanes include preferably $R_1R_2SiCl_2$, where $R_1$ and $R_2$ may independently be an ethyl, phenyl or vinyl group. The organosilicon preceramic polymers may be further modified, for example, by incorporating vinyl functionality by reacting with the polymer itself. This may be achieved, for example, by co-reacting the polymer with a vinyl (Vi) halosilane such as $ViR_1R_2SiCl$, where $R_1$ and $R_2$ may each independently be methyl or phenyl.

Another type of organosilicon polymer which can be spun utilizing the process of the present invention is one which comprises a plurality of cyclic and/or linear precurser residues having a backbone of repeating silicon and nitrogen atoms. These polymers form novel ladder-like or planar array structures that are stable at room temperature and thermally stable up to about 550° C. The ladder-like or planar array polymers are formed in high yield by reaction of the cyclic and/or linear residues in the presence of a basic catalyst capable of deprotonating an NH function adjacent to silicon. These polymers and their preparation are described more fully in U.S. Pat. No. 4,482,669 to Seyferth et al, assigned on its face to Massachusetts Institute of Technology, which patent is herein incorporated by reference.

Other organometallic preceramic polymers which can be spun in accordance with the present invention include aluminum- and boron-containing polymers. Among the aluminum-containing polymers are those which can be pyrolyzed to alumina (U.S. Pat. Nos. 4,514,555 and 4,533,712) as well as aluminum nitride as disclosed in commonly assigned, U.S. Pat. No. 4,687,657. As disclosed in U.S. Pat. No. 4,687,657, poly-N-alkyliminoalanes containing a backbone of repeating aluminum and nitrogen groups can be pyrodyzed to aluminum nitride. The formation of the poly-N-alkyliminoalanes are disclosed in U.S. Pat. Nos. 4,022,209; 4,032,553; 4,064,153 and 4,128,567. Boron-containing polymers, particularly those obtained from boranes are useful in the present invention. Such polymers, for example can be prepared by the condensation of boranes with Lewis bases. Such polymers are well known and prepared by condensing a borane such as diborane, pentaborane or decaborane with Lewis bases such as amines, amides, isocyanates, nitriles and phosphines. Any borane containing 2-10 boron atoms are useful. A particularly preferred borane-containing polymer is one formed by the condensation of decaborane and dimethylformamide (DMF). The borane-Lewis base condensation polymers are known and described, for example, in *POLYMER LETTERS*, Vol. 2, pp. 987-989 (1964); Chemical Society (London) Spec. Publ. No. 15 (1961), "Types of Polymer Combination among the Non-metallic Elements", Anton B. Burg, pp. 17-31; U.S. Pat. Nos. 2,925,440; 3,025,326; 3,035,949; 3,071,552; and British Patent 912,530, all of which are herein incorporated by reference. Blends of organometallic polymers can also be utilized and may be advantageous in forming ceramic alloy fibers such as set forth in previously aforementioned U.S. Pat. No. 4,687,657.

Typical of the organometallic preceramic polymers is their low molecular weight. Thus, molecular weights $(M_n)$ for the organometallic polymers typically vary from about 450 to 20,000, more typically from about 500 to 5,000, and most likely and preferred for spinning in accordance with the present invention are polymers having a molecular weight of from about 750 to 2,000.

In accordance with this invention, the above described organometallic preceramic polymers are melt spun into fibers with a melt spinning apparatus which utilizes a melt pool for feeding the molten polymer to the spinneret. With a melt pool, the polymer metering pump is not provided with any mechanical back pressure in contrast to prior art methods wherein the polymer metering pump is provided with a substantial back pressure from an extruder which melts the polymer and screw-feeds same to the metering pump. In this invention, uniform feeding of the polymer is not interrupted by packing of the solid polymer as in conventional screw-feeding devices. Another aspect of the melt spinning apparatus and process of the present invention is the use of a solvent spinning spinneret instead of conventional melt spinning spinnerets. The solvent spinning jet is used at lower pressures and is cup-shaped in which a small pool of the molten polymer forms upstream of the spinning surface. In contrast, the melt spinning jets are heavy flat disks.

The operation of a typical melt pool spinning apparatus for use in the present invention can be described with reference to the FIGURE. Molten polymer is fed to reservoir 1 at a rate sufficient to maintain a pool 2 of the molten polymer upstream of polymer metering pump 4. Melt pool 2 supplies molten polymer to polymer metering pump 4. There is no mechanical back pressure applied to melt pool 2 such as by means of an extruder or the like as in prior art methods using screw-feeding devices. Reservoir 1 is maintained at atmospheric pressure. A small gas pressure may be applied in reservoir 1 or even a slight vacuum if flow to pump 4 can be assured. The polymer metering pump 4 feeds the melted preceramic polymer from melt pool 2 to a filter pack which can consist of a plurality of porous disks and/or fine screens. The filter pack shown in the FIGURE is a dual filter of glass beads 6 and porous metal disk 8. The filter pack filters the composition to remove gells and foreign particles. To reduce the pressure of the melt prior to reaching spinneret 10, the melt from the filter pack is passed through hole 5 in plate 7 which is positioned immediately downstream of the filter pack and through pipe 9 which directs the melt to the spinneret 10. Spinneret 10 is one which is used for spinning solutions of solvated polymers into fibers. Solvent spinning spinneret 10 is of generally lighter weight and operates at a substantially lower pressure than the thicker, heavier weight melt spinning spinnerets. Chrome plated solvent spinning spinnerets have been found useful and are capable of spinning the preceramic polymers into fiber without adherence of the polymer and consequent filament breakage during extrusion. Spinneret 10 is cup-shaped and, thus, during operation allows a small melt pool 12 of molten polymer to form upstream and contiguous with the face of the spinneret. This small melt pool 12 is believed to facilitate fiber formation. Fine screens 13 can be placed upstream of melt pool 12 to remove gells.

The preceramic polymer can be melted and fed to reservoir 1 and melt pool 2 in various ways. It is preferable, however, to feed the polymer to the melt pool 2 in the molten state. Feeding the polymer as a solid powder to reservoir 1 and then melting to form melt pool 2 may result in difficulties in obtaining a constant melt pool depth and achieving uniform melting of the polymer prior to feeding to the spinneret. Moreover, using a conventional hopper containing a screw dispersing means to feed a solid particulate polymer may crush the polymer into a fine powder which will likely pack at the exit of the hopper restricting further flow. Heat rising from the apparatus may also make the polymer powder tacky at the hopper exit causing further restriction in polymer flow.

A system which feeds the polymer in the molten state to melt pool 2 is preferred. A useful system is shown in the FIGURE. Thus, as shown, a charge of the powdered polymer is placed within a ram cylinder 14 and pushed there-through by means of ram or plunger means 16. Plunger 16 can be activated and the speed thereof controlled by a motor (not shown). Plunger 16 feeds the powdered polymer through ram cylinder 14 to a heated zone 17 which is heated by means of heater band 18 placed around the ram cylinder 14. Heater band 18 heats the powdered polymer above the melting point thereof. The melted polymer forms a pool 19 in ram cone 20, which is provided with feeder tube 22 from which the melted polymer drips or otherwise flows from pool 19 to the melt pool 2 for supplying polymer metering pump 14. A gas line 24 can provide an inert gas such as argon or nitrogen to maintain a desired atmosphere within the ram cylinder and throughout the spinning apparatus. A viewport 26 allows inspection of the apparatus. An additional heater band 28 can be provided in reservoir 1 to insure that melt pool 2 remains molten. Although not shown, additional heater bands may be placed around portions of the apparatus where the preceramic polymer must be maintained in the molten state.

The temperature needed to melt the preceramic polymer will vary depending upon the particular polymer utilized. Typically, these organometallic polymers will melt in the range of about 100° to 350° C. During spinning, the fluid pressure in the filter pack will range from about 500–5,000 psi and at the spinneret will typically range from about 100 to 500 psi, more typically between about 100 and 250 psi. This spinneret pressure is substantially less than melt spinning operation wherein pressure at the spinneret typically ranges from about 1000 to 5000 psi.

The method and apparatus of the present invention have been found to provide a satisfactory solution to the problems associated with the spinning of organometallic preceramic polymers which have a tendency to bubble during extrusion thereof and have been very difficult to transfer through the apparatus in solid form. The preceramic polymer compositions are now able to be spun into fiber in a satisfactory manner utilizing a melt pool without back pressure as the polymer supply for the polymer metering pump. Thus this invention provides a substantial improvement in the art of forming ceramic fibers from these polymeric materials.

EXAMPLE

Utilizing an apparatus as shown in the FIGURE, a powdered hydridopolysilazane, $T_g$ of about 75° C., was charged into a ram cylinder, melted, allowed to drip into a melt pool and spun into fibers. The operating conditions were as follows:

| Temperatures | |
| --- | --- |
| Ram Melt Cone | 209° C. |
| Melt Pool | 202° C. |
| Barrel | 160° C. |

|  |  |
|---|---|
| Pump | 160° C. |
| Filter Pack | 160° C. |
| Spinneret | 160° C. |
| Pressure |  |
| Polymer Pump | 28.1 psi |
| Filter Pack | 1000 psi |

The filter pack consisted of a glass bead filter, two porous metal filters of 2 micron and 5 micron pores, respectively, and a course screen. The spinneret was a 40 hole, 300 micron stainless steel solvent spinning spinneret which was chrome plated.

The run continued for over an hour at which time the polymer was exhausted in the ram cylinder. The fiber was taken up by hand and by bobbin to obtain diameter measurements.

|  |  |
|---|---|
| Free fall | 40 to 85 microns |
| 100 meters per minute | 32 microns |
| 150 meters per minute | 7.5 mcirons |

The free fall sample was taken up by hand accounting for the variability of fiber diameter. The 150 meter per minute sample was taken while the ram cylinder was running out of polymer and accounts for the low diameter which was measured.

What is claimed is:

1. A process for melt spinning organometallic preceramic polymers having a molecular weight ($M_n$) of from about 450 to 20,000 into fibers comprising; heating said preceramic polymer provided in powder form above the melting point thereof, forming a stagnant melt pool of said melted polymer and pumping said melted polymer from said melt pool directly to a spinneret which extrudes said polymer into fibers.

2. The process of claim 1 comprising melting said powdered polymer upstream from said melt pool and adding said melted polymer in molten form to said melt pool.

3. The process of claim 1 wherein said molecular weight is from about 500 to 5,000.

4. The process of claim 3 wherein said molecular weight is from about 750 to 2,000.

5. The process of claim 1 wherein said organometallic polymer contains a backbone of metal elements linked together in a chain or alternately with a nonmetallic element.

6. The process of claim 5 wherein said organometallic polymer contains silicon, boron or aluminum elements.

7. The process of claim 1 wherein said organometallic polymer is an organosilicon preceramic polymer.

8. The process of claim 7 wherein said organosilicon preceramic polymer is a polysilazane.

9. The process of claim 1 wherein said spinneret is cup-shaped and a second melt pool is provided contiguous and upstream of the face of said spinneret.

10. The process of claim 1 wherein the pressure of said polymer at said spinneret is from about 100 to 500 psi.

11. The process of claim 1 wherein said spinneret is a solvent spinning spinneret having an orifice diameter of about 300 microns.

12. The process of claim 11 wherein said spinneret is chrome plated.

* * * * *